US008489610B2

(12) United States Patent
Kan

(10) Patent No.: US 8,489,610 B2
(45) Date of Patent: Jul. 16, 2013

(54) METHOD, SYSTEM AND PROGRAM FOR INFORMATION RE-ORGANIZATION

(75) Inventor: Masaki Kan, Tokyo (JP)

(73) Assignee: NEC Corporation, Tokyo (JP)

( * ) Notice: Subject to any disclaimer, the term of this patent is extended or adjusted under 35 U.S.C. 154(b) by 115 days.

(21) Appl. No.: 12/920,200

(22) PCT Filed: Mar. 27, 2009

(86) PCT No.: PCT/JP2009/056296
§ 371 (c)(1),
(2), (4) Date: Aug. 30, 2010

(87) PCT Pub. No.: WO2009/119811
PCT Pub. Date: Oct. 1, 2009

(65) Prior Publication Data
US 2011/0010369 A1    Jan. 13, 2011

(30) Foreign Application Priority Data

Mar. 28, 2008  (JP) .................. 2008-087240

(51) Int. Cl.
*G06F 7/00* (2006.01)
*G06F 17/30* (2006.01)
(52) U.S. Cl.
USPC ........... 707/741; 707/742; 707/743; 707/744; 707/802; 707/803
(58) Field of Classification Search
USPC ................. 707/696, 736, 741, 742, 743, 744, 707/745, 746, 802, 803, 999.1
See application file for complete search history.

(56) References Cited

U.S. PATENT DOCUMENTS

| 6,904,596 | B1 * | 6/2005 | Clark et al. .................. 719/310 |
| 8,126,895 | B2 * | 2/2012 | Sargent et al. ............... 707/741 |
| 2006/0059178 | A1 * | 3/2006 | Baron et al. ................. 707/100 |
| 2006/0059238 | A1 * | 3/2006 | Slater et al. ................. 709/206 |
| 2007/0130199 | A1 * | 6/2007 | Yoshida et al. ............. 707/104.1 |
| 2008/0177777 | A1 * | 7/2008 | Osaki et al. ................. 707/102 |
| 2009/0055420 | A1 * | 2/2009 | Phaal et al. ................. 707/101 |
| 2009/0132669 | A1 * | 5/2009 | Milliken et al. ............. 709/206 |

FOREIGN PATENT DOCUMENTS

| JP | 11-161686 A | 6/1900 |
| JP | 3-276368 A | 12/1991 |
| JP | 4-115332 A | 4/1992 |
| JP | 6-28229 A | 2/1994 |

(Continued)

OTHER PUBLICATIONS

S. Buttcher et al., "A Security Model for Full-Text File System Search in Multi-User Environments", USENIX Association. FAST '05: 4th USENIX Conference on File and Storage Technologies. 2005, pp. 169-182.

(Continued)

*Primary Examiner* — Hares Jami

(57) ABSTRACT

An information re-organization system includes a plurality of counters coordinated to meaning attributes, and a re-organization incentive notification unit that updates, in case the information stored in preset storage unit has been updated, value of a counter out of the multiple counters that has the meaning attribute associated with contents updated. The information re-organization system also includes an information re-organization processor that executes, in case the value of the counter section updated has met one of a number of predetermined conditions for information re-organization, a processing for information re-organization corresponding to the condition for information re-organization on the information stored in the preset storage unit.

15 Claims, 13 Drawing Sheets

FOREIGN PATENT DOCUMENTS

| | | | |
|---|---|---|---|
| JP | 6-215037 | A | 8/1994 |
| JP | 11-161686 | A | 6/1999 |
| JP | 2001036568 | A | 2/2001 |

OTHER PUBLICATIONS

International Search Report for PCT/JP2009/056296 mailed Jun. 30, 2009.

K. Kita et al., "Information Retrieval Algorithm", Kyoritsu Shuppan Publishing Co. Ltd., Jan. 1, 2002, pp. 6, 160-179.

S. Buttoner et al., "A Security Model for Full-Text File System Search in Multi-User Environments", USENIX Association, FAST '06: 4th USENIX Conference on File and Storage Technologies. 2005. pp. 169-182.

* cited by examiner

FIG. 3

| COUNTER IDS | VALUES |
|---|---|
| a | 20 |
| b | 2 |
| c | 5 |
| ... | ... |

FIG. 8

| COUNTER IDS | VALUES | PROCESSING TIME |
|---|---|---|
| a | 20 | 1 hour (per 40) |
| b | 2 | 2 hours (per 20) |
| c | 5 | 2 hours (per 10) |
| .. | .. | .. |

FIG. 11

| NAMES OF ACCOUNTS | VALUES OF THE COUNTER SECTIONS |
|---|---|
| aaaa | 20 |
| bbbb | 2 |
| cccc | 5 |
| ... | ... |

FIG. 13

| COUNTER IDS | VALUES OF THE COUNTER SECTIONS |
|---|---|
| a (COLUMN A VALUES BEING 1-10) | 20 |
| b (COLUMN A VALUES BEING 90-100) | 2 |
| c (COLUMN B VALUE BEING SINCE 2008/1/1) | 5 |
| ... | ... |

METHOD, SYSTEM AND PROGRAM FOR INFORMATION RE-ORGANIZATION

REFERENCE TO RELATED APPLICATION

The present application is the National Phase of PCT/JP2009/056296, filed Mar. 27, 2009, which claims priority based on JP Patent Application 2008-087240 filed on Mar. 28, 2008. The total disclosures of the patent application of the senior filing date are to be incorporated by reference herein.

TECHNICAL FIELD

This invention relates to a system, a method and a program for information re-organization. More particularly, this invention relates to a system, a method and a program for information re-organization in which the information stored in an arbitrary storage means is re-organized pursuant to a predetermined target.

BACKGROUND

As a method for full-text retrieval that comprehensively retrieves a targeted character/letter string from voluminous documents, there are known a grep type retrieval (sequential retrieval) and an index type retrieval. The grep type retrieval is typified by a grep command in UNIX (registered trademark), whilst the index type retrieval is typified by an inverted index, and is an indexing retrieval that makes use of an index.

The former retrieval, viz., the grep type retrieval, sequentially scans files as the subjects of retrieval. Hence, the response performance is lowered in case the number of files being retrieved has increased drastically. Thus, if desired to implement the retrieval function for the voluminous information, the index type retrieval is used. Non-Patent Document 1 is directed to explanation of the principle of the index type retrieval that makes use of the above mentioned inverted file.

Recently, the above mentioned index type retrieval has been ushered extensively into a field different from a search engine of the Internet. Patent Document 1 has disclosed an e-mail system having the function of the full-text retrieval by an index.

In the above-mentioned e-mail system, it is basically necessary that indices are prepared and held separately on the user-by-user basis. The reason is that, if a plurality of users make use of a sole index, it becomes necessary to provide a scheme for managing access control, thus possibly deteriorating the performance. On the other hand, if the weighted representation (ranking) of the results of retrieval is to be realized in accordance with, for example, a TF-IDF method, it becomes necessary to provide a separate scheme of not allowing a keyword appearing in a mail of a given user to be reflected in the weighting for another user (see Non-Patent Document 2).

As typical of the techniques of updating the indices of a database, there are the following techniques. Viz., Patent Document 2 has disclosed a document storage retrieval system in which an index for retrieval is prepared not synchronously with respect to document storage but asynchronously. Patent Document 3 has disclosed a data base system of performing retrieval with the aid of an index, in which an index is generated or dropped based on the access frequency of each attribute (key) of data to be retrieved.

[Patent Document 1] JP Patent Kokai Publication No. JP-P2001-036568A

[Patent Document 2] JP Patent Kokai Publication No. JP-A-3-276368

[Patent Document 3] JP Patent Kokai Publication No. JP-A-6-215037

[Non-Patent Document 1] Kenji Kita, Kazuhiko Tsuda and Masamiki Shishibori, 'Information Retrieval Algorithm', Kyoritsu Shuppan Publishing Co. Ltd., Jan. 1, 2002, pp. 6 and pp. 160 to 179

[Non-Patent Document 2] Stefan Buettcher and Charles L. A. Clarke, "A Security Model for Full-text File System Search in Multi-User Environments", In proceedings of the 4th Conference on USENIX Conference on File and Storage Technologies (FAST05)—Volume 4 (San Francisco, Calif. Dec. 13-16, 2005), USENIX Association Berkeley Calif. 13-13

SUMMARY

The disclosures of the above mentioned Patent Documents 1 to 3 and Non-Patent Documents 1 and 2 are incorporated by reference herein by reference thereto.

The following analysis is made from the viewpoint of the present invention.

Given the information stored in arbitrary storage means, it may sometimes become necessary to prepare other data from the information or to perform certain processing such as that of transforming or re-arranging the data structure of the information. Such necessity may arise in order to speedily perform certain processing on the information stored in the arbitrary storage means or from management requirements. Examples of the processing include preparing indices in the e-mail system or pre-processing for a set of e-mails in a mail box. The processing of preparing or transforming into data of a data structure dedicated to a particular target based on the information stored in the arbitrary storage means is termed "information re-organization" in the present description. The information re-organization is to comprehend, in addition to preparation of the retrieval indices, referred to above, the preparation of a database for data analysis, such as data warehouse (DWH), or re-organization of a database suffering from deterioration in configuration.

As stated in Patent Document 2, the information re-organization processing, such as index update, is time-consuming. If this operation is performed in real time, the response performance of the system may be affected significantly. For example, if an index for e-mail retrieval is updated each time an e-mail is transmitted, received or otherwise acted on, the overhead of the processing may be manifested in a response characteristic or the use feel of the system.

The technique disclosed in Patent Document 3 may be ranked as the technique that limits the capacity of the memory and that avoids indices from increasing to no purpose from the above perspective.

In preparing indices used in full-text indexing, it is necessary, as indicated in Patent Document 1, to read out letter/character strings in electronic files, extract words appearing therein and to update the total of the indices for the words extracted. Hence, the volume of data updated is excessive, with the readout processing as well as the extraction processing increasing in proportion to the number of the electronic files.

Under these circumstances, the information re-organization processing is sometimes carried out in a lump in the nighttime when the influence on the working systems is relatively small. In this case, the latest information may not be included in the results of the retrieval processing (or in the results of, the analysis processing) until the time the information re-organization processing comes to a close. In particular, in the case of the function of full-text retrieval of e-mails, latest mails received may not be reflected in the retrieved results.

Even if the information re-organization processing is carried out in the nighttime, there is presented another problem that the reorganization processing may not necessarily be completed during the nighttime. The same may be said of the case where reorganization processing is carried out before working systems come into operation. Viz., since the time of completion of the reorganization processing may not be known, there is presented a further problem that response within a preset time may not be assured for users.

Such a method is sometimes used which consists in buffering update contents for arbitrary storage means from one subject of re-organization to another (in the case of e-mails, from user to user). In this case, an exorbitant storage capacity is needed especially in case there are larger numbers of subjects for re-organization (users in case of e-mails).

In view of the above mentioned status of the related art, it is an object of the present invention to provide a system, a method and a program for information re-organization, according to which, in case the information re-organization processing is carried out asynchronously with respect to information updating for arbitrary storage means, it is possible to control the time taken for information re-organization processing as well as to control the necessary computer resources.

In one aspect, an information re-organization system according to the present invention includes a plurality of counters coordinated to meaning attributes, and a re-organization incentive notification unit that updates, in case the information stored in a preset storage means has been updated, value of a counter out of the multiple counters that has the meaning attribute associated with contents updated. The information re-organization system also includes an information re-organization processor that executes, in case the counter value updated has met one of a number of predetermined conditions for information re-organization, a processing for information re-organization corresponding to the condition for information re-organization on the information stored in the preset storage means.

In a second aspect, a method for information re-organization according to the present invention includes: having a computer hold a plurality of counters coordinated to meaning attributes, and updating, in case the information stored in preset storage means is updated, one of the multiple counters that has a meaning attribute associated with contents updated. The method for information re-organization also includes executing, in case the value of the counter has met one of preset conditions for information re-organization, a processing for information re-organization corresponding to the condition for information re-organization on the information stored in the preset storage means. Incidentally, this method invention was tied to a particular apparatus such as the information re-organization system of the first aspect.

In a third aspect, a program (computer readable program) for information re-organization according to the present invention allows a computer system to perform the processings of: providing a plurality of counters coordinated to meaning attributes, updating, in case the information stored in preset storage means has been updated, value of a counter out of the multiple counters that has the meaning attribute associated with contents updated, and executing, in case the counter value updated has met one of a number of predetermined conditions for information re-organization, a processing for information re-organization corresponding to the condition for information re-organization on the information stored in the preset storage means.

The meritorious effects of the present invention are summarized as follows.

According to the present invention, it is possible to estimate the time of execution of the information re-organization processing to control the execution of the information re-organization in accordance with a condition of execution that has been set with the contents of information re-organization or the processing time as a measure. The reason is that, in light of the information that the time or the amount of computer resources necessary for information re-organization is roughly proportionate to the updated amount of the information, the information re-organization is executed based on the value of a counter that indicates the updated amount of the information.

BRIEF DESCRIPTION OF THE DRAWINGS

FIG. 3 is a diagrammatic view for illustrating a re-organization counter of the information re-organization system of the first exemplary embodiment of the present invention.

FIG. 8 is a diagrammatic view for illustrating schemata of a re-organization counter of the information re-organization system according to the fifth exemplary embodiment of the present invention.

FIG. 11 is a diagrammatic view for illustrating schemata of a re-organization counter of the information re-organization system (mail system with a retrieving function) according to the sixth exemplary embodiment of the present invention.

FIG. 13 is a diagrammatic view for illustrating schemata of a re-organization counter of the information re-organization system (stream processing system) according to the seventh exemplary embodiment of the present invention.

As to explanation of the symbols, please refer to the end of the specification.

PREFERRED MODES

Preferred exemplary embodiments of the present invention will be described in detail with reference to the drawings.

[Outline of the Invention]

Figure 1:
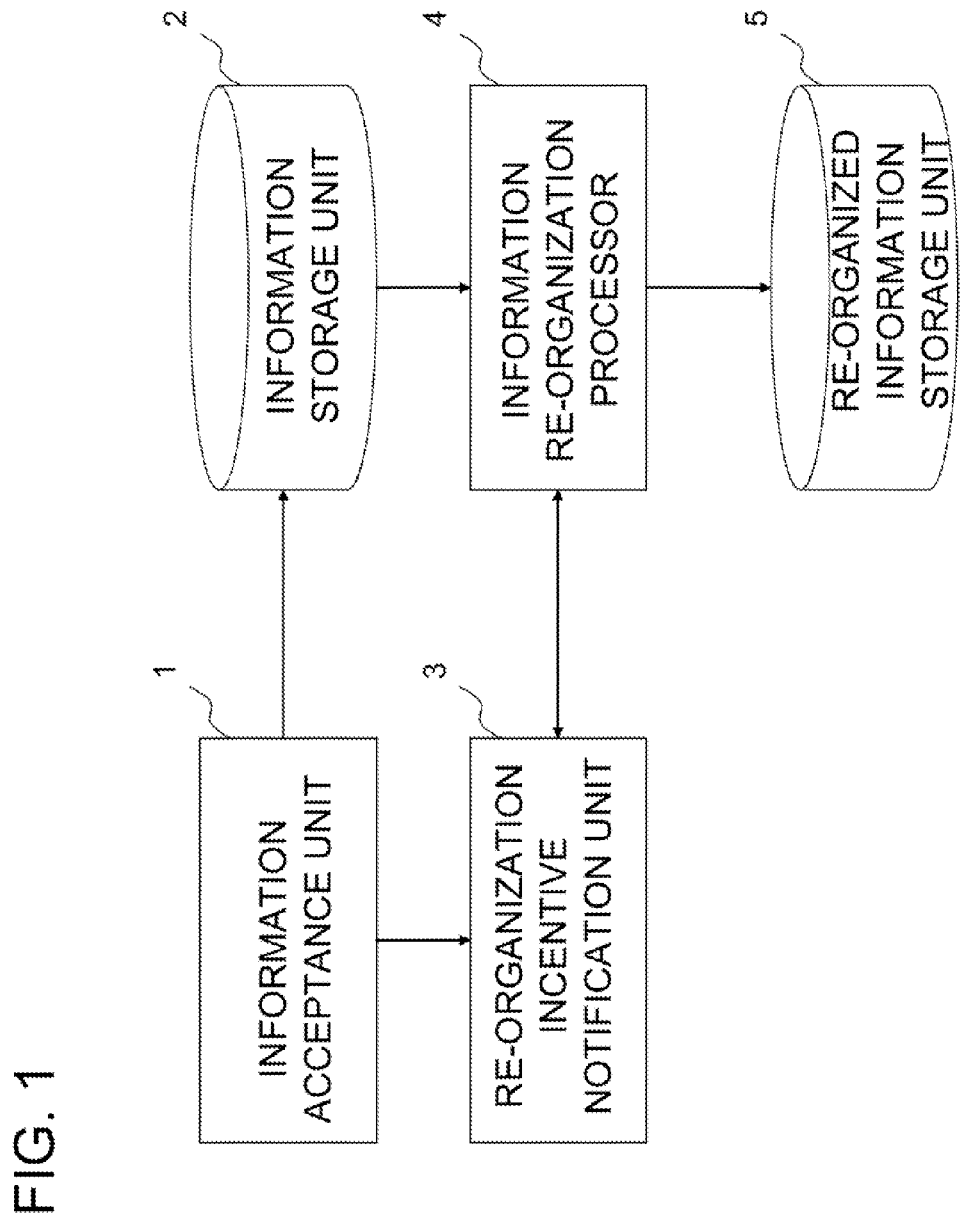
FIG. 1 is a schematic block diagram showing an arrangement of an information re-organization system according to the present invention.

FIG. 1 schematically shows an arrangement of an information re-organization system according to the present invention. Referring to FIG. 1, the information re-organization system includes an information acceptance unit 1, an information storage unit (memory mean) 2, a re-organization incentive notification unit 3, an information re-organization processor 4 and a re-organized information storage unit 5.

These means operate substantially as follows:

The information acceptance unit 1 performs the role of updating the information for the information storage unit 2 and accepting the newly arriving information. Specifically, the information acceptance unit may be a mail server for accepting transactions for a database or mails, an MTA (Mail Transfer Agent) or an MDA (Mail Delivery Agent).

The information storage unit 2 is a storage means for retaining the new information accepted by the information acceptance unit 1 or the updated information. Specifically, the information storage unit 2 may be a memory of a database system or a memory of a mail server including a mail box.

The re-organization incentive notification unit 3 retains several counters associated with meaning attributes. In case the information has been accepted by the information acceptance unit 1, the re-organization incentive notification unit updates the value of the counter whose meaning attribute is correlated to the accepted information. In case the counter value has met a certain preset information re-organization condition, the re-organization incentive notification unit instructs the information re-organization processor 4 to execute the information re-organization. In case a preset counter re-setting condition has been met, the re-organization incentive notification unit 3 performs a relevant counter re-setting operation.

The information re-organization processor 4 reads in the necessary information from the information storage unit 2, based on a notification from the re-organization incentive notification unit 3, to perform the processing of information re-organization such as database re-organization or indexing of user's e-mails.

The re-organized information storage unit 5 is a memory for retaining the database re-organized by the information re-organization processor 4, or for retaining the re-organized information, such as indices for e-mail retrieval.

The condition for information re-organization is set so that the processing of information re-organization will be finished in time depending on the necessity (priority ranking) of respective re-organization processing operations, the processing capability of the information re-organization processor 4 or on the time within which the information re-organization processing may be executed. By so doing, the processing for information re-organization may positively be completed within limited time duration.

First Exemplary Embodiment

Figure 2:
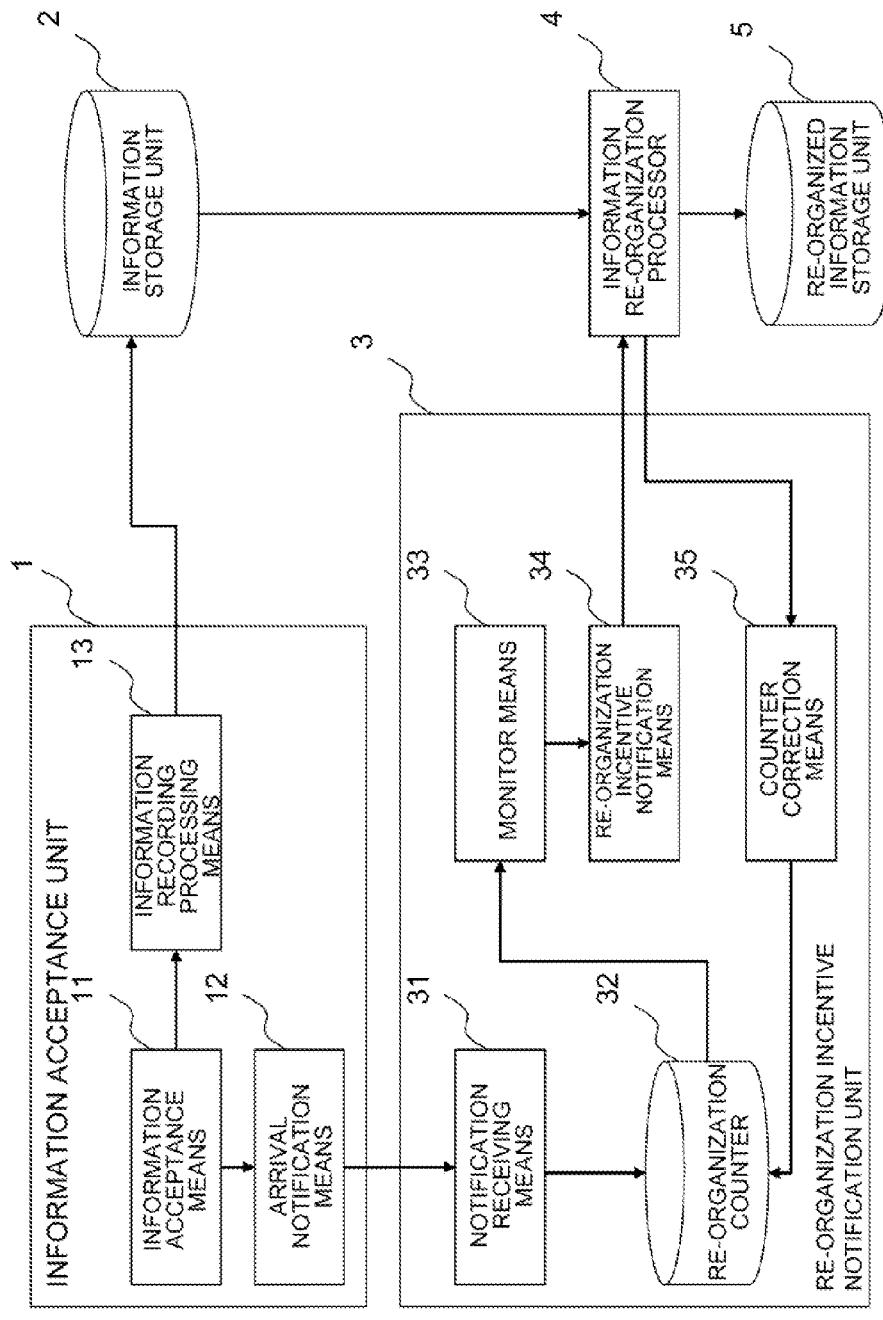
FIG. 2 is a block diagram showing an arrangement of the information re-organization system according to a first exemplary embodiment of the present invention.

A first exemplary embodiment of the present invention will now be described in detail with reference to the drawings. FIG. 2 depicts a block diagram showing an arrangement of an information re-organization system of the first exemplary embodiment of the present invention.

The information acceptance unit 1 includes an information acceptance unit 11, an arrival notification unit 12 and an information recording processing unit 13.

The information acceptance unit 211 performs the function of accepting an information update event or the new information for the information storage unit 2 from outside and of transferring the information update event or the new information to the arrival notification unit 12 or to the information recording processing unit 13.

After receiving the information by the information acceptance unit 11, the arrival notification unit 12 identifies, from the so received information, the re-organization processing the necessity for which has increased. The arrival notification unit sends the information indicating the sort of the reorganization processing in question to the re-organization incentive notification unit 3. It is observed that the notification by the arrival notification unit 12 may not necessarily identify a single sort of the re-organization processing but may also be a notification of two or more sorts of re-organization processing.

The above mentioned sorts of the re-organization processing may, of course, specify the difference in the contents of the reorganization processing per se. As a matter of course, the reorganization processing may specify, for example, processing of physically re-arranging e-mails in the order they were transmitted, processing of drop of the header information in the mail box, the processing of e-mail indexing, processing of transferring the e-mail to data storage destination, processing of distributed data placement or processing of re-distribution of distributed data. In addition, the reorganization processing may specify the difference in the subjects of reorganization processing, for example, the indexing of an e-mail to a user A as destination and the indexing of another e-mail to a user B as destination. Further, the reorganization processing may specify various combinations thereof and, for example, may sort e-mails to the user A as destination or separate nuisance mails among e-mails addressed to the user A. The reorganization processing may also drop nuisance mails addressed to the user B or perform the processing for transferring e-mails addressed to the users A, B or C to the mail storage destinations.

The arrival notification unit 12 may be arranged on the re-organization incentive notification unit 3. In this case, the information acceptance unit 1 transfers part or all of the commands or the information it has received to the re-organization incentive notification unit 3, which re-organization incentive notification unit 3 then performs the processing of identifying the sorts of the re-organization processing.

The information recording processing unit 13 performs the function of recording the information received by the information acceptance unit 11 in the information storage unit 2.

The re-organization incentive notification unit 3 includes a notification receiving unit 31, a re-organization counter 32, a monitor unit 33, a re-organization incentive notification unit 34, and a counter correction unit 35.

The notification receiving unit 31 accepts the notification issued by the information notification unit 12 to update the re-organization counter 32. Specifically, the notification receiving unit performs the processing of increasing the count value of the counter for the sorts of the reorganization processing, as notified by the arrival notification unit 12, at a preset width.

The re-organization counter 32 is provided on a memory of a computer that forms the re-organization incentive notification unit 3. The re-organization counter performs the role of recording the status of arrival of the new information or the information update event, accepted by the information acceptance unit 1, from one meaning attribute to another. Specifically, the memory may be a magnetic memory or a magnetic disc provided in a computer that forms the re-organization incentive notification unit 3. It is observed that the meaning attribute denotes the meaning-oriented attribute proper to the information per se. The meaning attribute has been prescribed to identify one of a plurality of counter sections of the re-organization counter 32 to be updated. For example, in a database system, the information may be prescribed to have different meaning attributes depending on a table updated or on column values. The information may also be set to have a different meaning attribute depending on the value in the new information accepted by the information acceptance unit 1. The information may further be set so as to have different meaning attributes depending on a keyword entered in an arbitrary field in a message.

Figure 3:
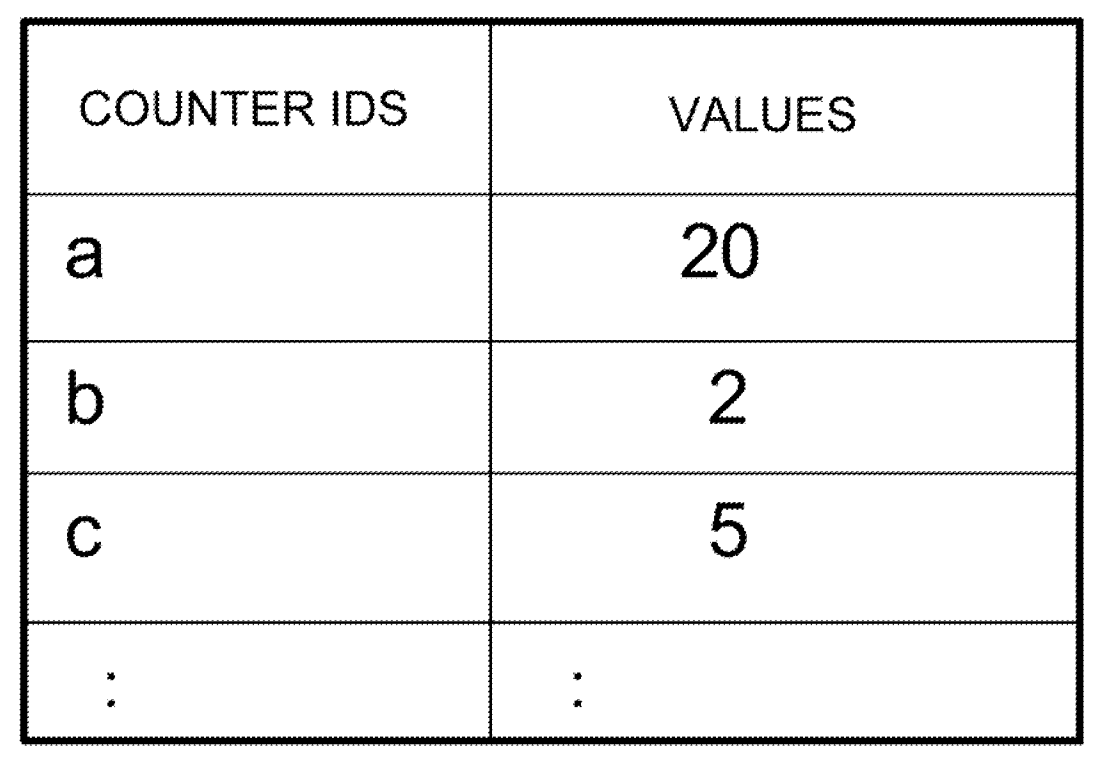

FIG. 3 illustrates schemata of the re-organization counter 32 provided with three counter sections a to c respectively associated with meaning attributes A to C. Each of the counter sections holds a value. In FIG. 3, the value of the counter section a of the meaning attribute A is 20. This indicates that, in case the information acceptance unit 1 issues a notification to the re-organization incentive notification unit 3 each time the information is updated or registration of the new information is made, and the re-organization incentive notification unit 3 increments the counter value by 1 each time the notification is issued, the update events or events of new registration of the information having the meaning attribute A occurred 20 times.

In FIG. 3, three counter sections a to c are shown. However, the number of the counter sections may suitably be increased or decreased depending on the sorts of the meaning attributes. Also, in FIG. 3, only the counter ID and its values are shown. However, the time of arrival of the notifications from the information acceptance unit 1 or the frequency of the events of arrival of the notifications in the latest time zone may also be recorded. The conditions for information re-organization may be set to refer to these.

The monitor unit 33 holds the condition for information re-organization, as set beforehand from one processing of information re-organization to another, in order to check whether or not the re-organization counter 32 has met the condition for information re-organization. When at least one condition for information re-organization has been met, the monitor unit 33 allows the re-organization incentive notification unit 34 to issue an information re-organization processing incentive notification. Meanwhile, the condition for information re-organization may be so set that, in case the values of the multiple counter sections are in excess of a preset value, the processing for information re-organization will be executed.

In general, the time taken in the information re-organization processing may be presumed to be proportional to the information update volume (number of times of information update events). Thus, by setting the condition for information re-organization so that the processing for information re-organization will be finished within a preset time, it may be assured that the processing for information re-organization will necessarily come to a close within a preset time.

For example, it is assumed that a given system is able to perform some information re-organization processing or other for one minute, and that an information re-organization processing A for 21 data may be finished within one minute at all times. Thus, by setting the counter section a=21, as the condition for executing certain information reorganization processing (condition for information re-organization), it may be assured that, when the value of the counter section a of FIG. 3 has reached 21, the monitor unit 33 issues a notification for an incentive for execution of the information re-organization by the monitor unit 33.

As a matter of course, the monitor unit 33 may be unified with the notification receiving unit 31. In this case, the notification receiving unit 31 checks to see whether or not the condition for information re-organization is met each time the counter section is incremented. The notification receiving unit 31 or the monitor unit 33 may periodically refer to the re-organization counter 32 to check whether or not the condition is met. The periodic check and the check each time the counter section is incremented may be combined together in case certain conditions for information re-organization are checked each time the counter is incremented and other conditions for information re-organization are checked periodically.

The re-organization incentive notification unit 34 performs the role of sending to the information re-organization processor 4 a message that prompts commencing the start of the processing for information re-organization based on the notification from the monitor unit 33.

The counter correction unit 35 performs the function of correcting the relevant counter sections of the re-organization counter 32 based on the notification from the information re-organization processor 4 to the effect that the processing for information re-organization has been finished. For example, if, with the counter section a=21, certain processing of information re-organization has been finished, the counter may be set to 0, whereby it becomes possible to count the necessity for the information re-organization processing from 0 again.

The information re-organization processor 4 prosecutes the information reorganization processing based on the notification from the re-organization incentive notification unit 3. At the same time, the information re-organization processor instructs the counter correction unit 35 to correct the re-organization counter 32.

The above mentioned processing units of the information acceptance unit 1 and the re-organization incentive notification unit 3, and the information re-organization processor 4, may be implemented by a program that allows a computer to execute the above mentioned processing operations. For example, the information acceptance unit 11 may be implemented by a program that accepts commands from the database system or by a program that receives a mail from outside the mail server. In similar manner, the above mentioned information recording processing unit 13 may be implemented by a program that decodes the command of the database system to write the so decoded command in a memory, or by a program that writes the incoming mails in a user-based mail box of the mail server.

Figure 4:
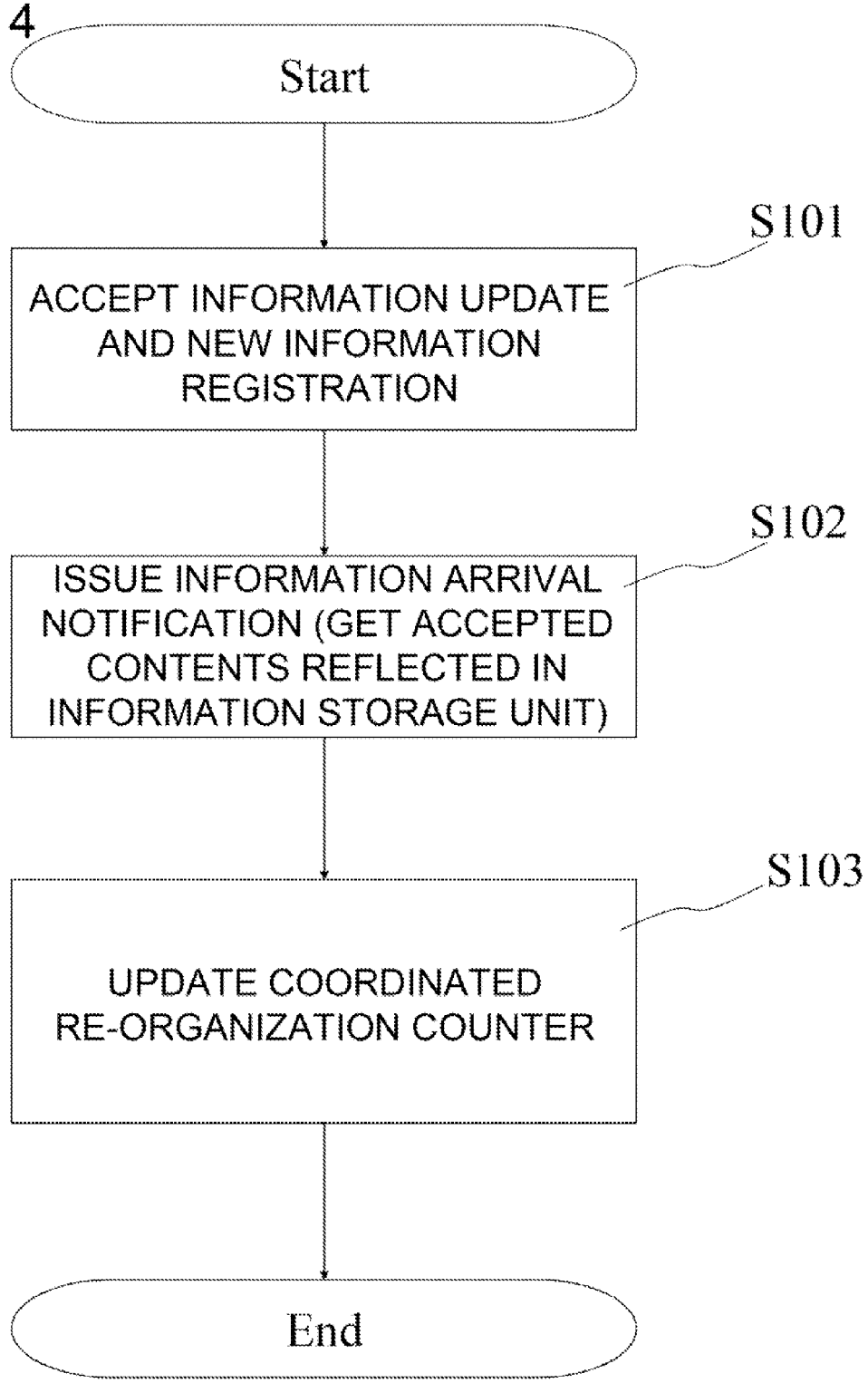
FIG. 4 is a flowchart showing the flow of operations until update of the re-organization counter of the information re-organization system of the first exemplary embodiment of the present invention.

The operation of the information re-organization system according to the first exemplary embodiment will be described in detail with reference to the drawings. FIG. 4 depicts a flowchart showing the flow of operations until update of the re-organization counter 32. Referring to FIG. 4, the information acceptance unit 1 initially accepts commands, such as those for update of the information or registration of the new information, or data, from an external system (step S101).

The information acceptance unit 11 then decodes the commands or data accepted to identify the meaning attributes thereof to issue a notification to the re-organization incentive notification unit 3 (step S102). The information acceptance unit 1 updates the contents of the information storage unit 2 based on the commands or data accepted at the step S101.

On receipt of the notification, the notification receiving unit 31 of the re-organization incentive notification unit 3 updates the counter section of the re-organization counter 32 associated with the meaning attribute stated in the notification (step S103).

At a time point of completion of the processing up to the above step S103 and the update processing of the information storage unit 2, a notification on receipt of these commands or data may be issued to e.g., an external system that transmitted the commands or the data to the information acceptance unit 1.

Figure 5:
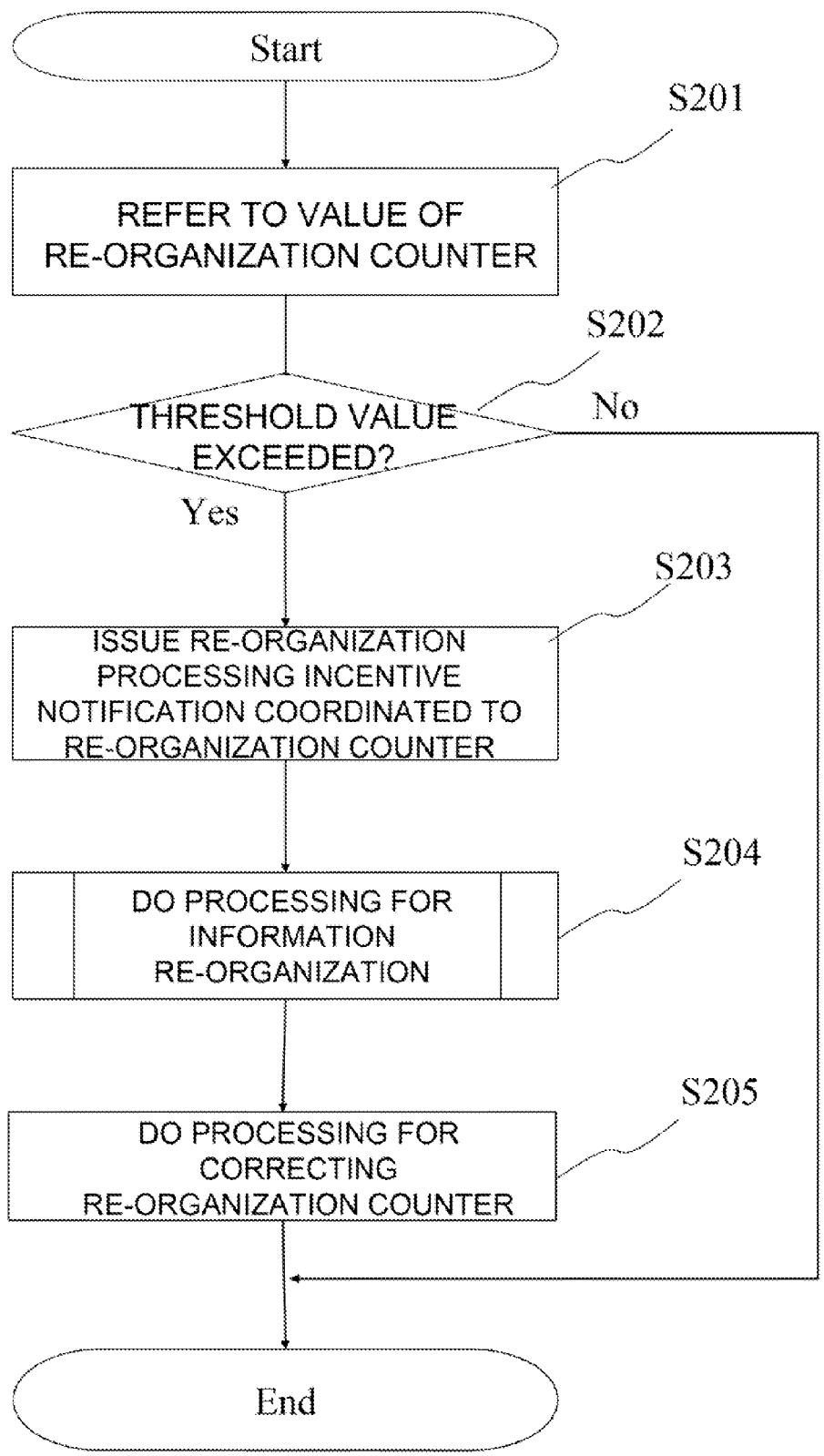
FIG. 5 is a flowchart for illustrating the operation of the information re-organization system of the first exemplary embodiment of the present invention.

FIG. 5 depicts a flowchart showing the operation of the information re-organization system that uses the re-organization counter updated as described above. Referring to FIG. 5, the monitor unit 33 refers to the value of the counter section of the re-organization counter 32 (step S201). The monitor unit 33 may refer to the re-organization counter 32 either periodically or with the update event of the re-organization counter 32 as an incentive, as described above.

The monitor unit 33 then checks to see whether or not the value of the counter section of the re-organization counter 32 is in meeting with the threshold value determined as the condition for information re-organization (step S202). It is unnecessary for the threshold value, used as the condition for information re-organization, to be a constant value. The threshold value may thus be changed as necessary for each re-organization counter section depending on the contents of the processing for information re-organization or on the service level for the user. If the value of the re-organization counter 32 is not in meeting with the condition for information re-organization, the processing comes to a close (No of step S202).

If the value of the re-organization counter 32 is in meeting with the condition for information re-organization, the monitor unit 33 notifies the re-organization incentive notification unit 34 that the notification of the incentive of execution of the information re-organization will be issued in keeping with the condition of information re-organization in question. The re-organization incentive notification unit 34 issues to the information re-organization processor 4 a notification of the execution incentive of the processing for information re-organization consistent with the condition for information re-organization in question (step S203).

On receipt of the notification for execution incentive for processing of the information re-organization, the information re-organization processor 4 acquires the necessary information from the information storage unit 2 to execute the processing for preparing the re-organization information to output the result to the re-organized information storage unit 5 (step S204). Depending on the contents of the information reorganization processing, the information reorganization processing may be executed, using the information acquired from the information storage unit 2 based on the information acquired from the re-organized information storage unit 5, for example, the results of the information re-organization processing carried out last time.

On completion of the information reorganization processing, the information re-organization processor 4 issues a notification to the counter correction unit 35. The counter correction unit 35 corrects the re-organization counter 32 based on the notification (step S205). It is observed that the processing at this step S205 may be carried out at a time juncture the information reorganization processing of the step S204 is commenced.

In the present exemplary embodiment, described above, the processing for information reorganization may be carried out with doing of a preset amount of the information update events or the new information registration events in the information storage unit 2 as an incentive. Since the time needed in the reorganization processing is proportional to the changed amount of the information, the information reorganization processing may necessarily be finished within a preset time by setting the condition for information reorganization processing from one information reorganization processing to another. It is thus possible to prevent that the processing for information re-organization is not finished within a scheduled time interval thus affecting the management of working systems. For example, it becomes possible to improve the response performance of the processing in need of the information reorganization processing.

Moreover, in the arrangement of the present exemplary embodiment, the information re-organization processor 4 is arranged to acquire the information stored in the information storage unit 2 to perform the processing for information reorganization processing without using e.g. a buffer. Such buffer may otherwise be needed to store the information used for the information re-organization processing. It is thus possible to reduce the storage capacity of the entire system. In comparison with a system where the information re-organization processing is executed each time the information is updated or each time the new information is registered, the information re-organization processing may be carried out efficiently on the whole. The reason is that it is now possible to suppress registration and drop of the new information or the reorganization processing of wasteful information accompanying a plurality of update events for the same location.

In the arrangement of the present exemplary embodiment, the information re-organization processor 4 performs the information re-organization processing only when the re-organization incentive notification unit 3 has notified the incentive of the information reorganization processing. It is thus possible to execute the information re-organization processing at a high speed with high efficiency. Of course, several information re-organization processing operations may be carried out with the date and time as an incentive.

Second Exemplary Embodiment

Figure 6:
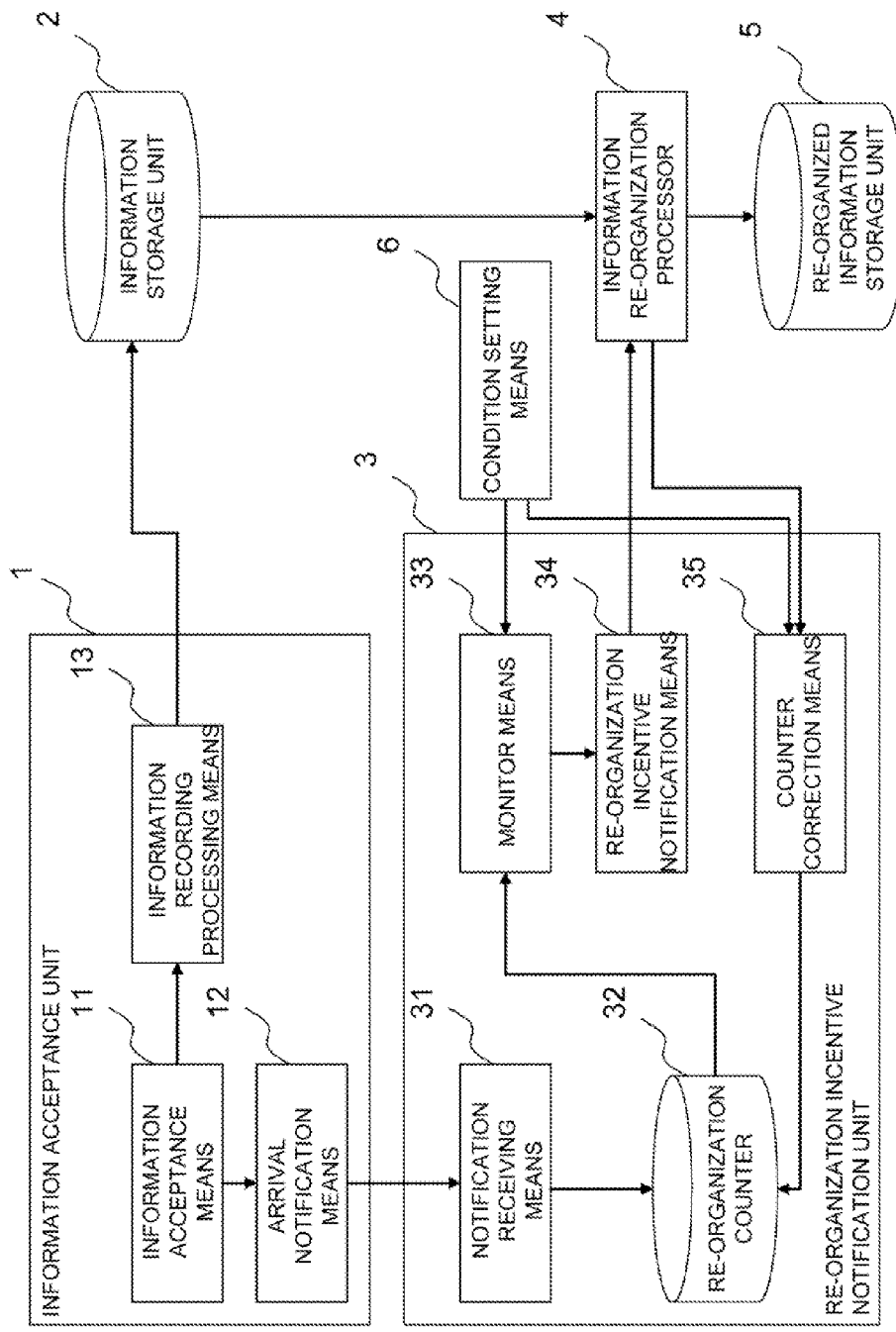
FIG. 6 is a block diagram showing an arrangement of an information re-organization system according to a second exemplary embodiment of the present invention.

A second exemplary embodiment of the present invention will now be described in detail with reference to the drawings. FIG. 6 depicts a block diagram showing an arrangement of the information re-organization system according to the second exemplary embodiment of the present invention. The present exemplary embodiment differs from the first exemplary embodiment in including a condition setting unit 6.

The condition setting unit 6 provides the function of changing the condition of the information re-organization operation of the monitor unit 33 or the correction operation of the counter correction unit 35. For example, a system superintendent may reduce the threshold value, as set for the condition of information re-organization of the monitor unit 33, in order to reduce the time interval needed in the information re-organization processing or the execution time interval of the information re-organization processing.

In the above described arrangement, it becomes possible to cope with increase or decrease of the processing time for information re-organization ascribable to variations in the processing capability of the information re-organization system. This adds to the above mentioned advantage of the first exemplary embodiment. Moreover, it becomes possible to cope with the situation in which the processing time for information re-organization appreciably surpasses the time anticipated from the amount of change of the information.

Third Exemplary Embodiment

A third exemplary embodiment of the present invention will now be described in detail with reference to the drawings. Since the present exemplary embodiment may be implemented with the same configuration as that of the information re-organization system of the first exemplary embodiment, described above, the point of difference in operation will now be described with reference to FIG. 2.

In the present exemplary embodiment, the re-organization incentive notification unit 3 (FIG. 2) specifies the data amount (processing volume) as the subject for information re-organization processing at the time of notification of the incentive for the information re-organization processing to the information re-organization processor 4. Specifically, the re-organization incentive notification unit 34 of the re-organization incentive notification unit 3 determines, using the counter sections held by the re-organization counter 32, the amount of data that needs to be processed by the information re-organization processor 4. The re-organization incentive notification unit notifies the information re-organization processor 4 of the so determined data volume along with the notification of the incentive.

For example, if the information re-organization system forms (re-organizes) an index for mail indexing, the value of the re-organization counter 32 is used as the information for identifying a mail as a subject of the indexing processing (processing for information re-organization). In notifying the incentive for information re-organization processing, the re-organization incentive notification unit 3 sends the mail as the subject of information re-organization processing to the information re-organization processor 4 as the value of the re-organization counter 32 remains unchanged or has been changed as necessary. The information re-organization processor 4 executes the indexing processing for the e-mail sent thereto.

The above arrangement is advantageous in that, in the information storage unit 2, re-organized information storage unit 5 or other components, it is unnecessary to hold the information that may be used for determining whether or not the data in the information storage unit 2 is the data being processed for information re-organization.

However, in the present exemplary embodiment, the data processed with information re-organization needs to be identified even in a notification from the information re-organization processor 4 to the counter correction unit 35.

Fourth Exemplary Embodiment

A fourth exemplary embodiment of the present invention will now be described in detail with reference to the drawings. Since the present exemplary embodiment may be implemented with the same arrangement as that of the information re-organization system of the first exemplary embodiment, described above, the point of difference in operation is now described with reference to FIG. 2.

In the present exemplary embodiment, it is presupposed that such a case may arise in which a notification from the information acceptance unit 1 to the re-organization incentive notification unit 3 is not possible. Based on this presupposition, the corresponding function is added to the information re-organization system of the first exemplary embodiment. It is supposed for example that the information acceptance unit 1 and the re-organization incentive notification unit 3 are implemented on respective separate computers, and a failure has occurred in a network system interconnecting the computers. In such case, a re-organization counter may not be in operation even though there are data in need of processing for information re-organization processing in the information storage unit 2.

There may also be a case where the information may not be transferred between the information acceptance unit 11 and the arrival notification unit 12 within the information acceptance unit 1. There may further be a case where the significant processing load is imposed on the information acceptance unit 1 so that the processing of implementing a subsidiary function such as that of the information re-organization system is temporarily not to be performed.

In such case, the re-organization incentive notification unit 3 of the above mentioned first exemplary embodiment is unable to update the re-organization counter 32 as long as the re-organization incentive notification unit is unable to receive the notification from the arrival notification unit 12. The re-organization incentive notification unit performs the operation shown in the above mentioned first exemplary embodiment only at a time point of commencing the transmission of notifications. In short, the processing for re-organization may not be prompted as long as there is no notification from the arrival notification unit 12. There is thus a possibility that the processing for re-organization becomes longer than originally expected.

The monitor unit 33 of the present exemplary embodiment operates as it holds a condition for information re-organization for the time of communication failure. This condition is separate from the condition for information re-organization for the normal operation. As an example of the condition for information re-organization for the time of communication failure, a threshold value for the condition for information re-organization, which is to be compared to a value of the re-organization counter 32, is set so as to be lower than the normal value.

In the present exemplary embodiment, it is presupposed that the information storage unit 2 or other memory means holds the information usable in giving a decision as to whether or not the processing for information re-organization is necessary for the information in the information storage unit 2. In such case, the information re-organization processor 4 is able to select data as a subject for information re-organization processing in order to execute the information re-organization processing thereon. For example, suppose that the information re-organization system prepares (re-organizes) an index for mail retrieval. If, in such case, the information as to whether or not a mail has been indexed is held in the mail box, the information re-organization processor 4 is able to reliably execute the indexing operation (re-organization).

It is thus possible, in the present exemplary embodiment, to execute the processing of executing the information reorganization processing even in case the re-organization counter may not be in operation due to communication failure between the information acceptance unit 1 and the re-organization incentive notification unit 3 or to an increased load in the information acceptance unit 1. Additionally, the present exemplary embodiment has an advantage that the amount of data to be processed for information re-organization (unprocessed data) is not increased beyond a necessary value as long as the disabled state of the re-organization counter persists.

In the above explanation of the fourth exemplary embodiment of the present invention, it is presupposed that the condition for information re-organization at the time of communication failures is separately provided. It is however possible to change the operation of the re-organization counter 32, on occurrence of a failure, without changing the condition for information re-organization. For example, the monitor unit 33 keeps on monitoring the increasing state (increment speed) of the re-organization counter 32. If a communication failure has occurred between the information acceptance unit 1 and the re-organization incentive notification unit 3, or the load has increased on the information acceptance unit 1, the monitor unit 33 operates to automatically increment the re-organization counter 32 based on the increasing state (increment speed) it is monitoring. In the present arrangement, it is possible to execute the processing for information re-organization in a proper manner even under a situation where the re-organization counter may not be in operation. It is similarly possible to use the changing of the condition for information re-organization and the forced operation of the re-organization counter in combination.

Fifth Exemplary Embodiment

In the second exemplary embodiment of the present invention, described above, the time of reorganization processing may be adjusted by a system superintendent changing the condition for information re-organization of the monitor unit 33. However, in the second exemplary embodiment, it is the condition for information re-organization that the system superintendent is able to adjust. If a certain condition for information re-organization has been set, it may sometimes occur that the time for processing for information re-organization expected by the system superintendent is not coincident with the time really taken for information re-organization. The fifth exemplary embodiment of the present invention is directed for warranting the time taken in the processing for information re-organization.

Figure 7:
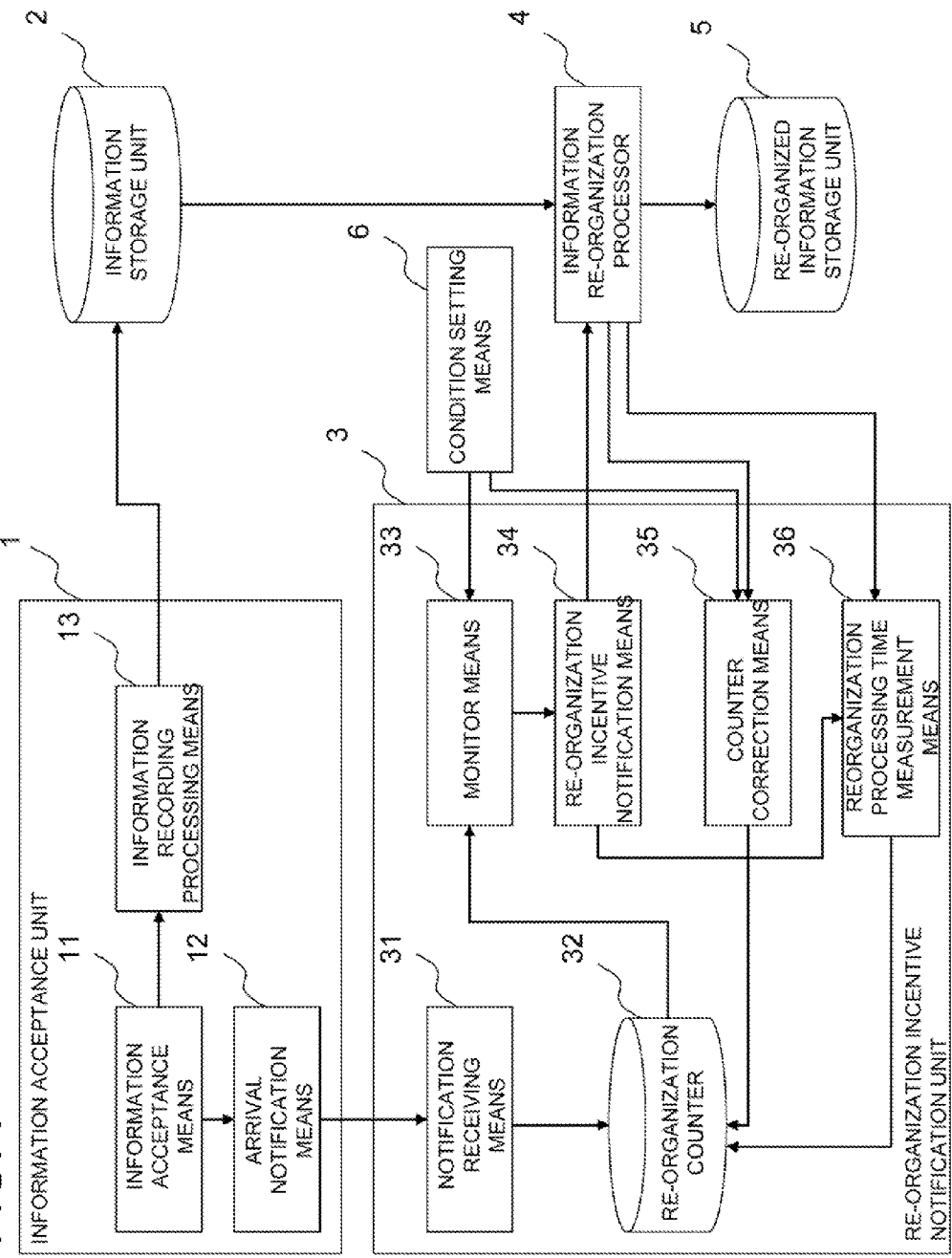
FIG. 7 is a block diagram showing an arrangement of an information re-organization system according to a fifth exemplary embodiment of the present invention.

FIG. 7 depicts a block diagram showing an arrangement of an information reorganization system according to a fifth exemplary embodiment of the present invention. The present exemplary embodiment differs from the information re-organization system of the above described first exemplary embodiment in including a reorganization processing time measurement unit 36. This reorganization processing time measurement unit measures the time taken in the information re-organization processing by the information re-organization processor 4.

The reorganization processing time measurement unit 36 performs the role of measuring and recording the time taken in the information reorganization processing carried out by the information re-organization processor 4. In FIG. 7, the reorganization processing time measurement unit 36 records the processing time for information re-organization by the re-organization counter 32. Of course, the reorganization processing time measurement unit 36 may record the processing time for information re-organization by a component other than the re-organization counter 32.

The reorganization processing time measurement unit 36 measures the time taken in the information reorganization processing based on the time interval between the time the re-organization incentive notification unit 34 issued the notification of the incentive for processing for information re-organization processing to the information re-organization processor 4 and the time of receipt of the notification of completion of processing by the information re-organization processor 4. Such a method may be used in which the information re-organization processor 4 measures the time of processing of information re-organization to notify the result to the reorganization processing time measurement unit 36. Such a method may also be used in which the time of processing of information re-organization is found based on a time interval between the time the re-organization incentive notification unit 34 issued the notification and the time of receipt of the counter correct command by the counter correction unit 35.

FIG. 8 shows a re-organization counter where the time of processing of information re-organization, measured as described above, has been recorded. In the case of FIG. 8, the processing time and the values of the counter sections (in parentheses), set as, the conditions for information re-organization, are recorded in a column 'processing time'. In the case of FIG. 8, it is recorded that the execution of the processing for information re-organization, controlled by the re-organization counter section a is executed when the value of the counter section is 40, and that the time taken for execution is one hour. Of course, the values of the counter sections, set as the above mentioned conditions for information re-organization, may be dispensed with, and the processing time per counter section may be recorded as '1.5 minute', for example. The time unit may arbitrarily be set.

As the time of processing for information re-organization, an average of the time needed in the total of past information re-organization processing operations or an average of past several information re-organization processing operations may be recorded. Or, the time of the directly previous information re-organization processing operation may be recorded. The total time of the past information re-organization processing operations may also be recorded. Further, the time or time/date of execution of the information re-organization processing operation may be recorded.

Figure 9:
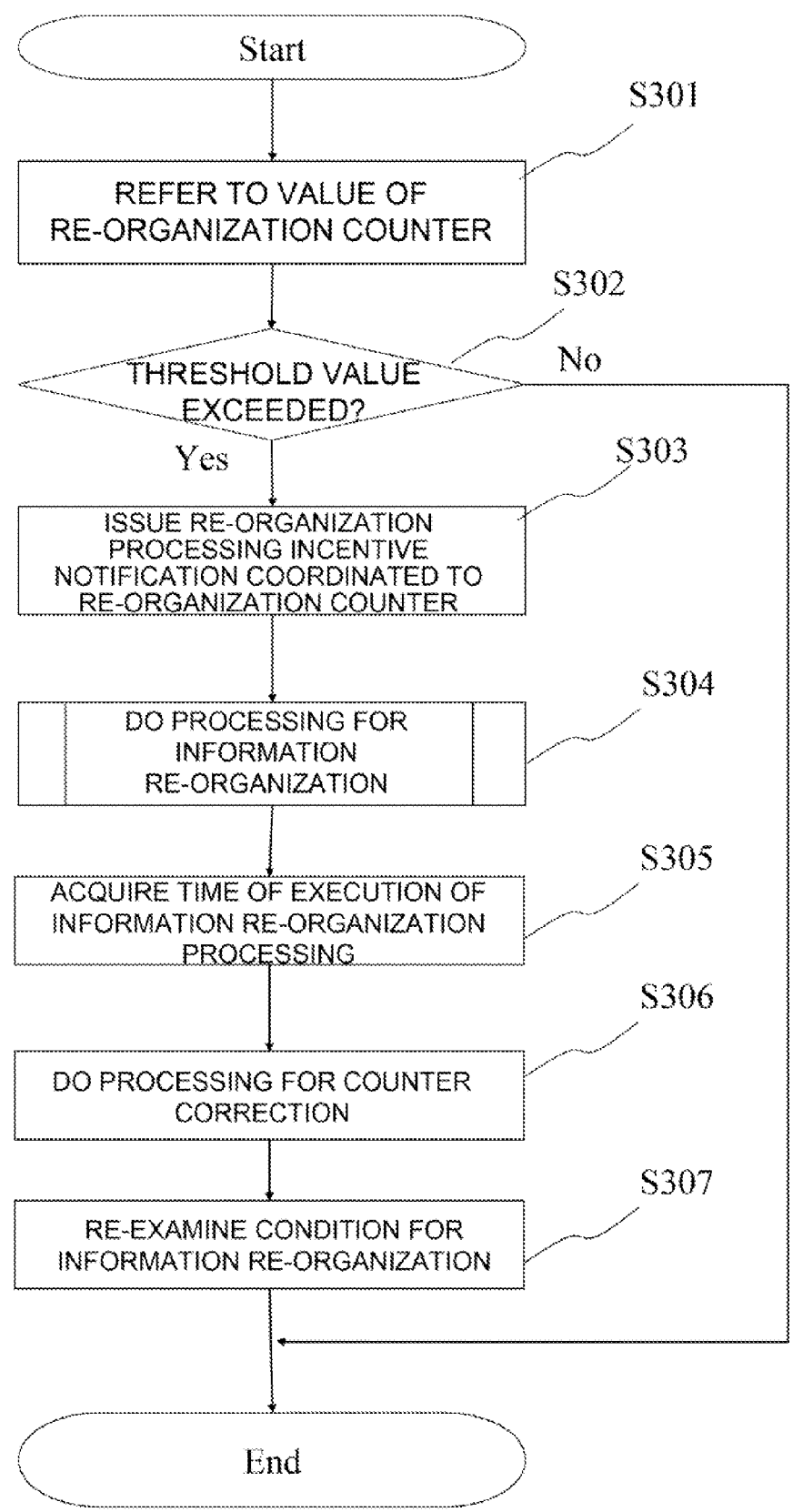
FIG. 9 is a flowchart for illustrating the operation of the information re-organization system according to the fifth exemplary embodiment of the present invention.

FIG. 9 depicts a flowchart representing the flow of the operations of the information re-organization system of the fifth exemplary embodiment of the present invention. The operations from the step of referencing the re-organization counter (step S301) until the step of re-organizing the information (step S304) of FIG. 9 are similar to those of the above mentioned first exemplary embodiment (FIG. 5). On completion of the processing for information re-organization of step S304, the reorganization processing time measurement unit 36 first measures the time of reorganization processing in the information re-organization processor 4 (step S305).

The counter correction unit 35 then corrects the re-organization counter 32 (step S306 of FIG. 9). Finally, the monitor unit 33 re-examines the condition for information re-organization using the time of processing for information re-organization recorded in the re-organization counter 32 (step S307).

The processing of re-examining the condition for information re-organization in the step S307 is carried out as follows: Initially, such a case is considered where there has been set a condition for information re-organization that the processing for information re-organization A is to be executed in case the counter section a has surpassed the threshold value α. It is also assumed that a system superintendent has entered, by the condition setting unit 6, such a condition that the processing for information re-organization A is desirably completed in approximately one hour.

At this time, the monitor unit 33 performs the processing of lowering the threshold value α, set as the condition for information re-organization, in case the time for processing for information re-organization A has exceeded one hour. The processing time for the information re-organization processing A for the next operation and the ensuing operations may thus be reduced.

If conversely the time for information re-organization processing for the processing for information re-organization A is appreciably shorter than one hour, the monitor unit 33 may perform the processing of increasing the threshold value α set as the condition for information re-organization. By so doing, the threshold value α may appreciably be raised if the time for information re-organization processing of the information re-organization A is less than 30 minutes, for example. It is thus possible to set the time needed for the next information re-organization A and for the ensuing information re-organizations at approximately one hour and to provide for a broader execution time interval to improve the efficiency of the information re-organization processing.

The above explanation of the exemplary embodiment has been made by taking an example configuration in which there is provided the reorganization processing time measurement unit 36. The condition for information re-organization is changed depending on whether or not the time for information re-organization processing is within a scheduled time. It is however possible to change the condition for information re-organization in the tightening or relaxing direction under other conditions. For example, it may be envisaged to change the conditions for information re-organization in their entirety depending on the load imposed on the information re-organization processor 4 or on the entire system. For example, if the load is imposed on the entire system so that it is anticipated that the time of information re-organization processing would become longer, the condition for information re-organization may be relaxed to give rise to the advantage equivalent to that of the above described exemplary embodiments.

Sixth Exemplary Embodiment

Mail Retrieval System

A sixth exemplary embodiment of the present invention, applied to a mail system of rendering e-mail retrieval services to a plurality of users, will now be described.

Figure 10:
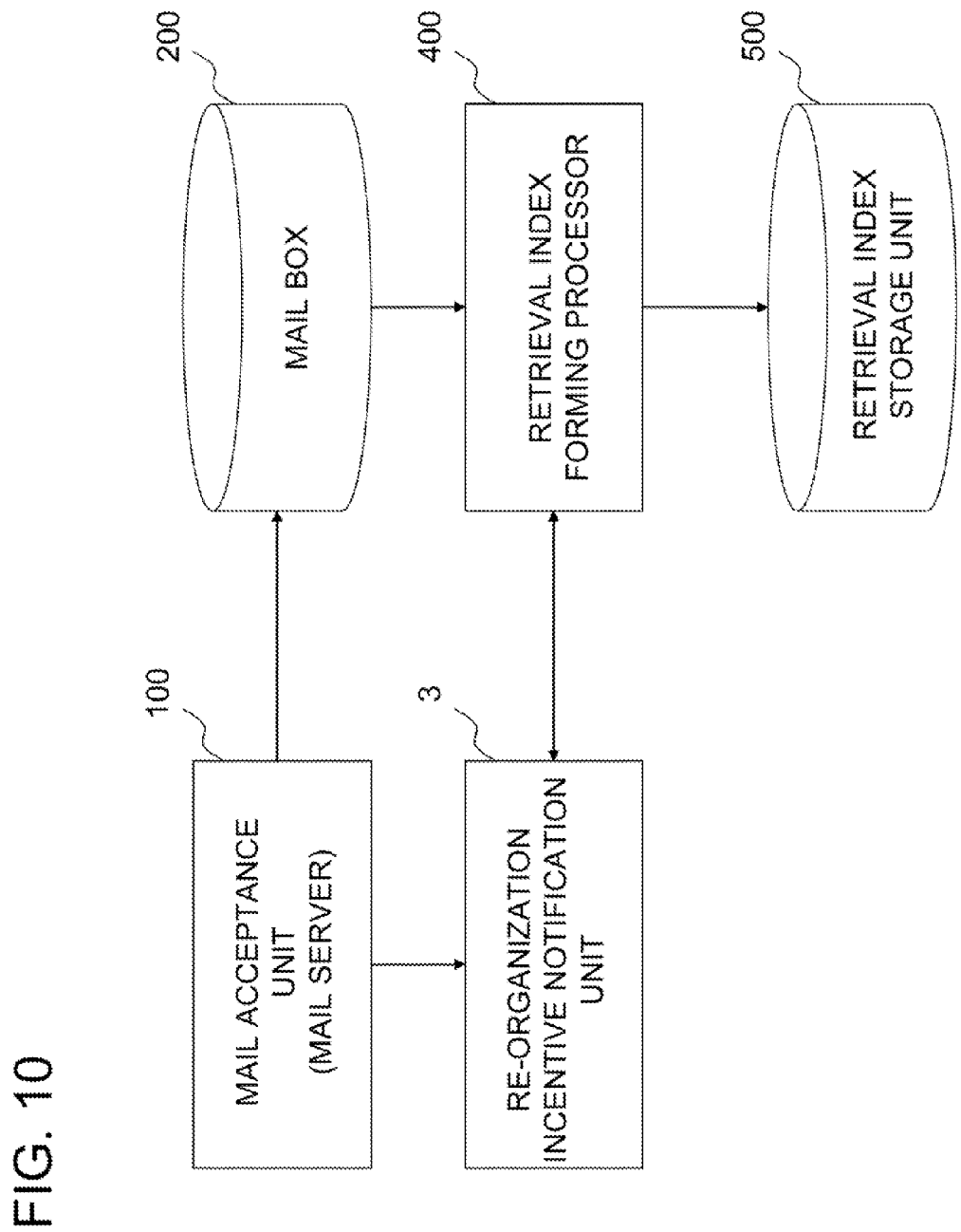
FIG. 10 is a block diagram showing an arrangement of an information re-organization system (mail system with a retrieving function) according to a sixth exemplary embodiment of the present invention.

FIG. 10 depicts a block diagram showing an arrangement of the sixth exemplary embodiment of the present invention. An information acceptance unit (mail server) 100 is equivalent to the information acceptance unit 1 of the first exemplary embodiment, and performs the role of accepting a mail for recording it in a user's mail box.

A mail box 200 is equivalent to the information storage unit 2 of the first exemplary embodiment. The mail box 200 may, for example, be a storage medium, such as a magnetic disc, tied to the mail acceptance unit (mail server) 100, for example, or may be a storage device, such as a file server, equipped with a storage medium.

The re-organization incentive notification unit 3 may be constructed by a computer operating as a component means of the re-organization incentive notification unit 3 under a computer program. Of course, the re-organization incentive notification unit 3 may be constructed by the same hardware as the mail acceptance unit (mail server) 100.

FIG. 11 shows the status of the re-organization counter 32 in the re-organization incentive notification unit 3 at a given time point.

Referring to FIG. 11, the re-organization counter 32 holds the values of the counter sections that count the number of mail arrival events. The values of the counter sections represent the results of counting the mail arrival events from one account to another. The account is a unit of forming the retrieval indices.

In FIG. 11, three accounts of aaaa, bbbb and cccc are shown. However, in actuality, there are a number of records in the re-organization counter 32 equal to the number of users.

The re-organization counter 32 may be implemented by a data structure such as a table of a database or a hash table on a program. Although a magnetic disc or a semiconductor memory, for example, may be used, it is more desirable to use a magnetic memory to provide for more speedy access to all records.

The mail acceptance unit (mail server) 100 includes a processing unit equivalent to the arrival notification unit 12 of the above described first exemplary embodiment. On receipt of a mail or on writing to a mail box, this processing unit extracts the name of an account of a receiver of the mail in question, as a meaning attribute, to send a notification including the information allowing for identification of the account name to the re-organization incentive notification unit 3.

The re-organization incentive notification unit 3, receiving the notification, includes a processing unit equivalent to the notification receiving unit 31 of the above described first exemplary embodiment. The re-organization incentive notification unit thus increments the counter of the relevant account name held by the re-organization counter 32 by 1.

The re-organization incentive notification unit 3 includes a processing unit equivalent to the monitor unit 33 of the above described first exemplary embodiment. The re-organization incentive notification unit requests a retrieval index forming processor 400 to form a retrieval index of the relevant account in case the counter section of the account name of the re-organization counter 32 has exceeded the preset threshold value α.

The retrieval index forming processor 400 is equivalent to the information re-organization processor 4 of the above described first exemplary embodiment. The retrieval index forming processor thus performs the processing of reading out mail data of the user in question from the mail box 200 and extracting index words, using a method of analysis of morphemes, for example, to update the retrieval index held by a retrieval index storage unit 500.

In the above mentioned processing for updating the retrieval index, the retrieval index forming processor 400 reads in a number of mails corresponding to the number determined by the threshold value α as counted from the new mail, from the mail box of the accounts to be updated. The retrieval index forming processor performs the indexing processing thereon. After the end of the indexing processing, the retrieval index forming processor 400 requests the re-organization incentive notification unit 3 to reset the counter of the accounts in subject to zero. It is observed that, since new mails may be incoming, a number of mails larger a preset ratio or a preset number than the index threshold value α may be made the subject of the indexing processing.

The retrieval index storage unit 500 performs the role of holding the retrieval index from user to user. The retrieval index storage unit 500 is a recording medium itself, for example, a magnetic disc, tied to the retrieval index forming processor 400. It may also be constructed as a recording device, such as a file server, equipped with the recording medium.

In a mail system, rendering retrieval services for e-mails for a plurality of users, it is desirable that, when a user exploits an e-mail, the retrieval index for the user is set so as to be latest. For example, a retrieval index may be updated by an incentive, such as user log-in to an e-mail system. The number of times of the update processing is approximately proportional to the number of non-indexed mails held by the user.

However, in the preset exemplary embodiment, if the above mentioned threshold value α is exceeded, the retrieval index is updated without waiting for log-in of the user. The number of non-indexed mails may thus be suppressed to the above mentioned threshold value α at most. Viz., the time taken in indexing a number of mails corresponding to the number equal to the threshold value α is equal to the maximum latency on the occasion of the user log-in (time taken until it becomes possible for the user to exploit the retrieval employing the latest index). Also, by adjusting the above mentioned threshold value α, it becomes possible to adjust the service level on the user basis, that is, from one retrieval index to another.

In case of a smaller threshold value α, the service level for the user is high. On the other hand, the retrieval indexing is low in efficiency, and hence more computer resources are needed. In case of a larger threshold value α, the service level for the user is low, however, the retrieval indexing is high in efficiency, with the result that only a small amount of computer resources are needed. Thus, by utilizing the present invention for an e-mail retrieval system, it becomes possible to provide an e-mail retrieval system in which the tradeoff between the amount of the computer resources needed and the service level for the user is adjustable.

Seventh Exemplary Embodiment

Stream Processing System

A seventh exemplary embodiment of the present invention, applied to a stream processing system, will now be described. By the stream processing system is meant such a system in which a preset information processing operation (query) is carried out, by way of the information re-organization processing, on data transmitted in the time domain (stream). For example, there are known instances of stream transmitting the sensor information, such as product management information RFID), financial information such as stock prices, or temperatures.

Figure 12:
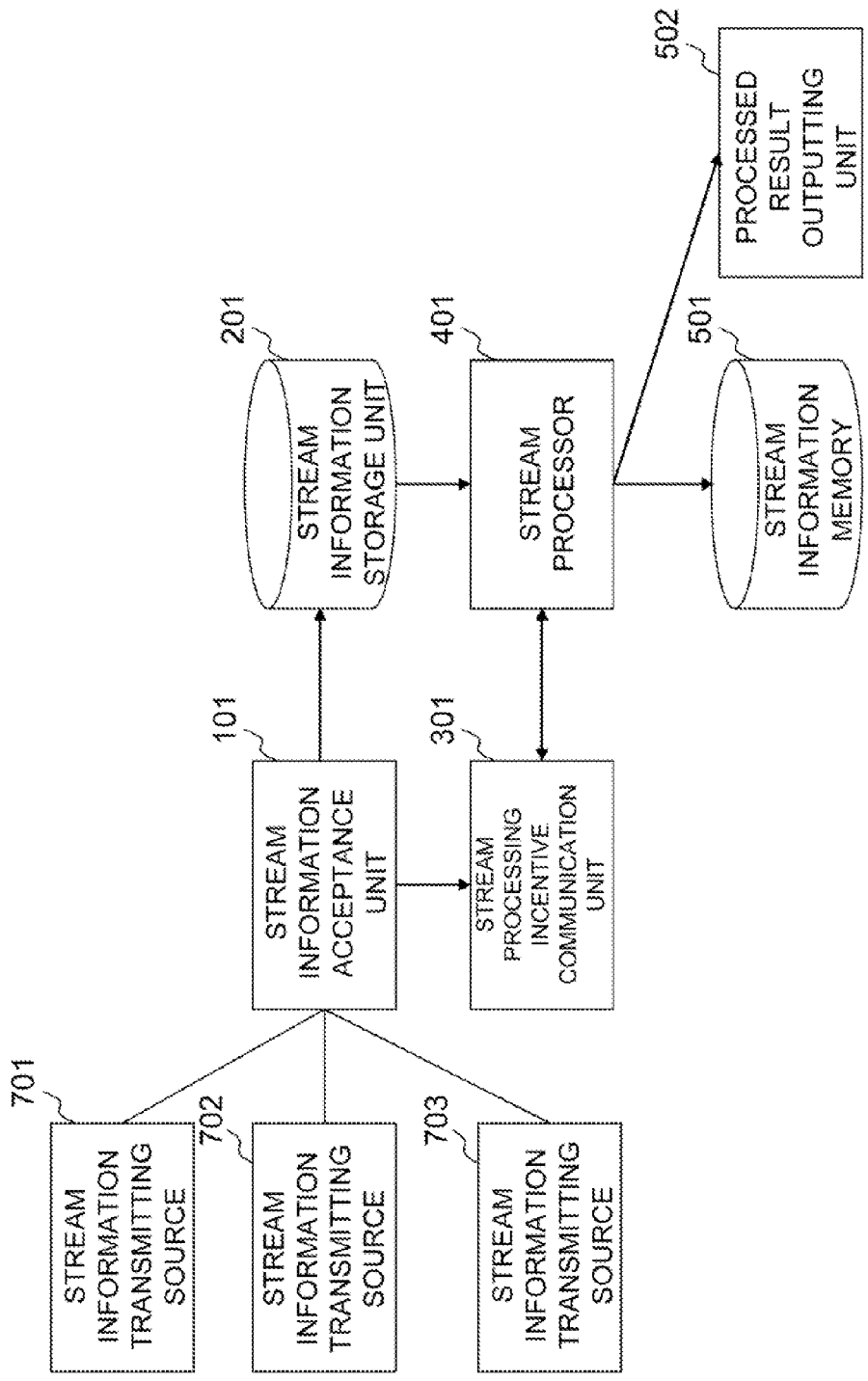
FIG. 12 is a block diagram showing an arrangement of an information re-organization system (stream processing system) according to a seventh exemplary embodiment of the present invention.

FIG. 12 depicts a block diagram showing an arrangement of the seventh exemplary embodiment of the present invention. A stream information acceptance unit 101 is equivalent to the information acceptance unit 1 of the first exemplary embodiment, and performs the role of accepting the stream information issued from time to time from stream information transmitting sources 701 to 703.

The stream information transmitting sources 701 to 703 represent a unit that transmits the stream information. These stream information transmitting sources may be sensors, equipment issuing the financial information, or software systems.

A stream information storage unit 201 retains the information, received by the stream information acceptance unit 101, either transiently or semi-permanently. The stream information storage unit 201 may be implemented by a known storage device. Since the stream information is mostly receivable in succession in larger quantities, the stream information storage unit is desirably a high-speed memory medium, such as a semiconductor memory. The stream information storage unit may also be a magnetic disc, in which case a recording system that allows for high-speed storage by sequential writing may be used. The stream information storage unit may further be implemented by a database software system.

A stream processing incentive communication unit 301 is equivalent to the re-organization incentive notification unit 3 of the above described first exemplary embodiment. The stream processing incentive communication unit may be constructed as a computer operating as a component means of the above mentioned re-organization incentive notification unit 3 under control by a computer program. The stream processing incentive communication unit may also be constructed by the same hardware as the stream information acceptance unit 101.

Similarly to the re-organization incentive notification unit 3 of the above described first exemplary embodiment, the stream processing incentive communication unit 301 includes a re-organization counter 32. FIG. 13 shows the state of the re-organization counter 32 within the re-organization incentive notification unit 3 at a certain time juncture. For example, the counter section a counts the number of the stream information whose value of a column A is within a range of 1 to 10. The information in the column A may, for example, be the temperature information as obtained by a sensor.

The stream processing incentive communication unit 301 includes a processing unit equivalent to the monitor unit 33 of the re-organization incentive notification unit 3 of the above described first exemplary embodiment. The stream processing incentive communication unit instructs a stream processor 401 to execute a stream information processing operation (query) associated with the meaning attribute when the counter section a has exceeded the threshold value. It is unnecessary for the single counter section (counter section a) to be associated with the stream information in a one-to-one relationship. The stream information processing operation (query) may be executed in case a plurality of counter sections have met the condition, or a plurality of stream information processing operations may be associated with a single counter section a.

The stream processor 401 is equivalent to the information re-organization processor 4 of the first exemplary embodiment, and executes the information processing for the stream information (query).

If the number of the sorts of the stream information processing operation (query) performed by the stream processor 401 is increased, coordinated counter sections are newly prepared, and the condition for executing the stream information processing is added. A user may input the condition to a management system for the stream information processing, or the stream processing incentive communication unit 301 may automatically prepare it from the pre-existing meaning attribute and from the conditions of execution.

A stream information memory 501 and the processed result outputting unit 502 are equivalent to the re-organized information storage unit 5 of the above described first exemplary embodiment. The stream information memory 501 represents a unit that stores the result of processing of the stream information, and is implemented by a variety of information systems inclusive of the database system. The processed result may not be stored in the stream information memory 501 but may be output. The processed result outputting unit 502 performs the role of demonstrating the result of processing of the stream information for the user.

The information re-organization system of the present invention, operating as described above, is able to efficiently carry out the stream information processing. The reason is that, since the re-organization incentive notification unit 3 determines the stream information processing incentive, there is no possibility of occurrence of inefficient processing of reading in data of the information storage unit 2 even though there is no information for processing.

Although description of certain preferred exemplary embodiments of the present invention has been made in the above, the present invention is not to be restricted to the illustrated exemplary embodiments. On the contrary, the present invention may further be open to modification, substitution or adjustment within the scope of the basic technical concept of the present invention. For example, the present invention may be applied to such uses as an information retrieval system for providing a plurality of users with the user-oriented information retrieval function, or a program for implementing the information retrieval system by a computer. The information retrieval system may be exemplified by a general electronic file full-text retrieval system, an e-mail retrieval system and a retrieval system in an RSS reader. The present invention may also be applied to such uses as a data warehouse system, a database system, an information analysis system, a stream processing system, a virus check system or a program for implementing the systems. The virus check system may be of the type in which the results of a virus check of an arbitrary drive or the file composing information is written in the drive.

The particular exemplary embodiments or examples may be modified or adjusted within the gamut of the entire disclosure of the present invention, inclusive of claims, based on the fundamental technical concept of the invention. Further, variegated combinations or selection of elements disclosed herein may be made within the framework of the claims. That is, the present invention may encompass various modifications or corrections that may occur to those skilled in the art in accordance with and within the gamut of the entire disclosure of the present invention, inclusive of claim and the technical concept of the present invention.

BRIEF DESCRIPTION OF THE SYMBOLS

| | |
|---|---|
| 1 | information acceptance unit |
| 2 | information storage unit |
| 3 | re-organization incentive notification unit |
| 4 | information re-organization processor |
| 5 | re-organized information storage unit |
| 6 | condition setting unit |
| 11 | information acceptance means |
| 12 | arrival notification means |
| 13 | information recording processing means |
| 31 | notification receiving means |
| 32 | re-organization counter |
| 33 | monitor means |
| 34 | re-organization incentive notification means |
| 35 | counter correction means |
| 36 | reorganization processing time measurement means |
| 100 | mail acceptance unit (mail server) |
| 101 | stream information acceptance unit |
| 200 | mail box |
| 201 | stream information storage unit |
| 301 | stream processing incentive communication unit |
| 400 | retrieval index forming processor |
| 401 | stream processor |
| 500 | retrieval index storage unit |
| 501 | stream information memory |
| 502 | processed result outputting unit |
| 701 to 703 | stream information transmitting sources |

What is claimed is:

1. An information re-organization system comprising:
a plurality of counters coordinated to meaning attributes;
a re-organization incentive notification unit that updates, in case the information stored in a preset storage means has been updated, value of a counter out of said multiple counters that has the meaning attribute coordinated to contents updated; and
an information re-organization processor that executes, in case the value of said counter or a combination of two or more values of said counter has met one or more of a number of predetermined conditions for information re-organization, a processing for information re-organization coordinated to said condition for information re-organization on the information stored in said preset storage means,
wherein at least one of the plurality of counters, the re-organization incentive notification unit and the information re-organization processor is a hardware component, and
wherein the information re-organization system further comprising:
measuring unit that measures an estimated time needed in said information re-organization processing,
wherein said number of predetermined conditions for information re-organization being changed based on the difference between the estimated time of preset information re-organization processing and the time actually taken in said information re-organization processing.

2. The information re-organization system according to claim 1, further comprising:
a counter correction unit that performs a reset operation for resetting the value of said counter in case a preset condition for counter correction has been met.

3. The information re-organization system according to claim 2, wherein
said condition for counter correction has been set for executing the resetting operation for the counter associated with said information re-organization processing in case the information re-organization processing has been completed.

4. The information re-organization system according to claim 1, further comprising:
a condition setting unit that accepts changes in said condition for information re-organization or in said condition for counter correction.

5. The information re-organization system according to claim 1, wherein
processing volume of said information re-organization processing is determined based on the value of said counter.

6. The information re-organization system according to claim 1, wherein,
if the updating for said preset storage means has not been made for a preset time period, said condition for information re-organization is changed.

7. The information re-organization system according to claim 1, wherein,
if the updating for said preset storage means has not been made for a preset time period, the update width of said counter is increased or decreased.

8. The information re-organization system according to claim 1, wherein
by way of performing said information re-organization processing, a retrieval index of the information stored in said preset storage means is re-organized.

9. The information re-organization system according to claim 8, further comprising:
a plurality of retrieval indices formed in response to contents of the information stored in said preset storage means, and a plurality of counters coordinated to said retrieval indices; at least one of said retrieval indices being selected at the time of information retrieval; wherein
one of said counters associated with updated contents of said storage means is updated; and wherein,
when the value of one of said counters has met said condition for information re-organization, re-organization of the retrieval index coordinated to said counter is commenced.

10. The information re-organization system according to claim 9, wherein
said condition for information re-organization may be changed from one retrieval index to another.

11. The information re-organization system according to claim 8, wherein
said preset storage means is a mail box that retains an e-mail of a mail server; and wherein
retrieval services of e-mails retained by said mail server are rendered using a retrieval index updated in response to the number of times of receipt of said e-mails.

12. The information re-organization system according to claim 1, wherein
said preset storage means is a stream information storage unit that retains the stream information transmitted from a stream information transmitting source;
one of said counters that is associated with the contents of said stream information is updated; and wherein
when the value of said counter has met a preset condition for information re-organization, the processing of information re-organization for said counter is executed on the stream information stored in said stream information storage unit.

13. The information re-organization system according to any one of claim 1, wherein said number of predetermined conditions for information re-organization is changed depending on a load imposed on said re-organization processor.

14. A method for information re-organization comprising:
having a computer hold a plurality of counters coordinated to meaning attributes;
updating, in case the information stored in preset storage means is updated, value of the counter out of said multiple counters that has a meaning attribute coordinated to contents updated; and
executing, in case the value of said counter or a combination of two or more values of said counter has met one or more of a number of predetermined conditions for information re-organization, a processing for information re-organization coordinated to said condition for information re-organization on the information stored in said preset storage means,
wherein said number of predetermined conditions for information re-organization being changed based on the difference between a measured estimated time of preset information re-organization processing and the time actually taken in said information re-organization processing.

15. A non-transitory computer readable medium having stored thereon a program for information re-organization; said program for information re-organization which when executed by a computer performs the method of:
providing a plurality of counters coordinated to meaning attributes;
updating, in case the information stored in preset storage means has been updated, value of a counter out of said multiple counters that has the meaning attribute coordinated to contents updated; and
executing, in case the value of said counter or a combination of two or more values of said counter has met one or more of a number of predetermined conditions for information re-organization, a processing for information re-organization coordinated to said condition for information re-organization on the information stored in said preset storage means,
wherein said number of predetermined conditions for information re-organization being changed based on the difference between a measured estimated time of preset information re-organization processing and the time actually taken in said information re-organization processing.

* * * * *